Jan. 19, 1954
G. E. PORTER
2,666,294
COMPOUND HYDRAULIC MASTER CYLINDER CONSTRUCTION
Filed July 24, 1951
2 Sheets-Sheet 1
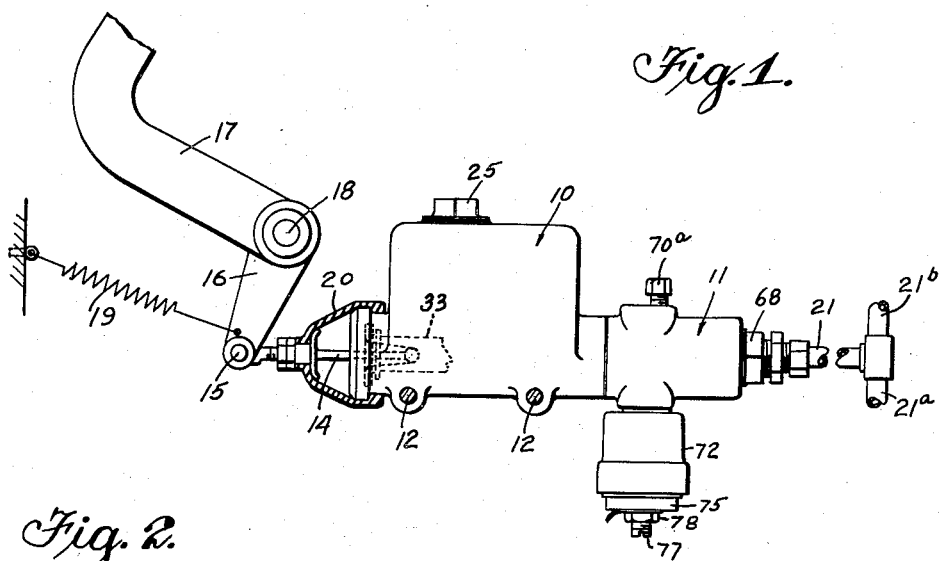
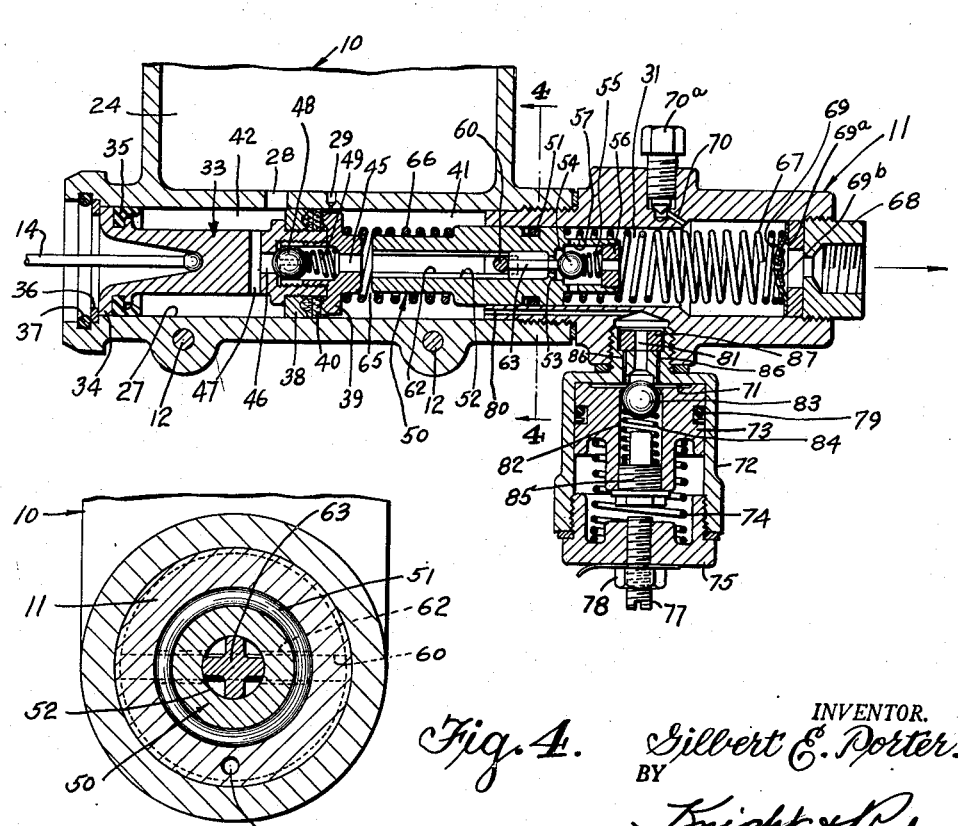
INVENTOR.
Gilbert E. Porter.
BY
Knight & Rodgers
ATTORNEYS.

Jan. 19, 1954            G. E. PORTER            2,666,294
COMPOUND HYDRAULIC MASTER CYLINDER CONSTRUCTION
Filed July 24, 1951            2 Sheets-Sheet 2
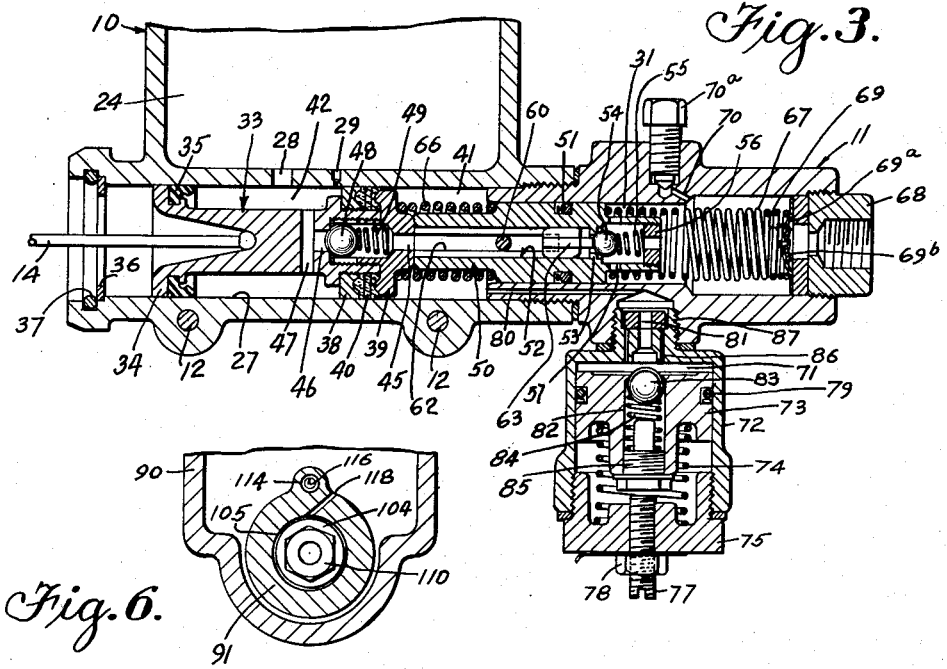
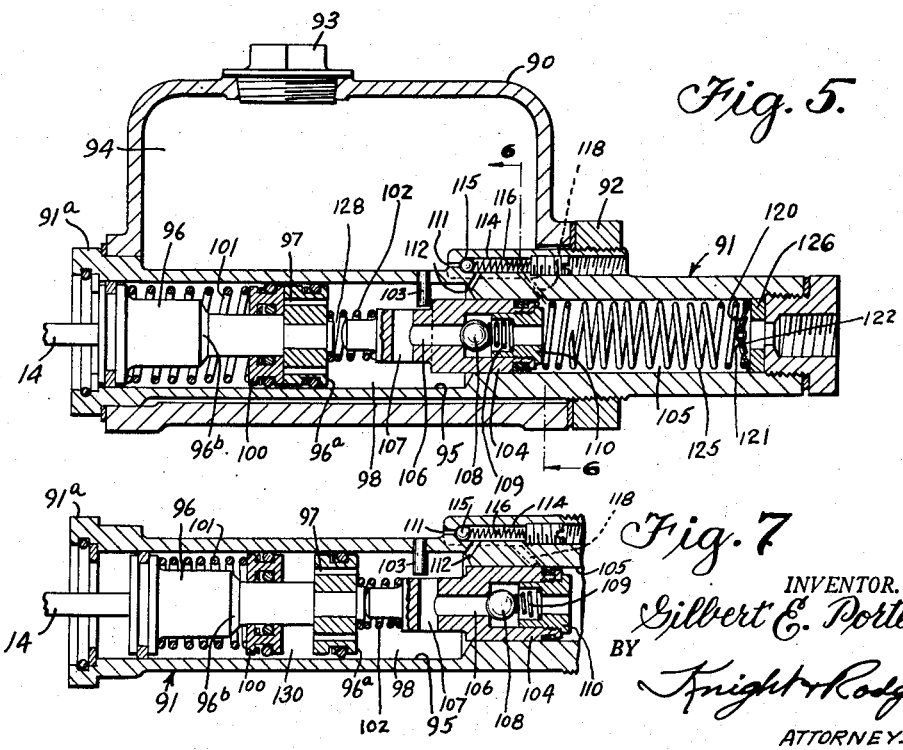
INVENTOR.
Gilbert E. Porter.
BY Knight & Rodgers
ATTORNEYS.

Patented Jan. 19, 1954

2,666,294

UNITED STATES PATENT OFFICE 2,666,294

COMPOUND HYDRAULIC MASTER CYLINDER CONSTRUCTION

Gilbert E. Porter, Los Angeles, Calif., assignor of forty-nine one-hundredths to Everett F. McClaren, Los Angeles, Calif.

Application July 24, 1951, Serial No. 238,231

14 Claims. (Cl. 60—54.6)

1

The present invention relates generally to hydraulic control systems and more particularly to constructions for a master cylinder designed to develop a hydraulic pressure within a control system.

Since the present invention has a particular application to a hydraulic system for applying brakes to the wheels of a vehicle, the device is shown and described in this connection; but it will be understood that my invention is not necessarily limited thereto but may be used in any type of a hydraulic actuating or control system.

It is widely recognized by people who drive automobiles that it is often difficult to achieve that perfection of control in the application of brakes which is to be desired. With a continual increase in the average speed at which automotive vehicles are moving, the work which the brakes are called upon to do is continually increasing; and this is especially true of heavy vehicles, such as commercial trucks. These conditions bring about the need for larger brakes and higher brake applying pressures which in turn mean that the operator has greater difficulty in not only applying the brake initially but in maintaining a substantial pressure on the brake pedal to maintain in turn the necessary braking force. For these reasons the advantages of the relative ease operation and control afforded the driver of the vehicle when hydraulic braking systems were first installed in automobiles to replace mechanical systems, have to a large extent disappeared and it is now desirable to improve the design of hydraulic braking systems in order to regain these advantages for the operator.

It is, therefore, a general object of my invention to provide an improved design for the hydraulic pressure generating cylinder that affords improved control and greater ease of operation to the operator of the vehicle.

It is also an object of my invention to provide a master cylinder construction for developing higher hydraulic pressures than the conventional system is capable of without a corresponding increase in the force required to be applied to the brake pedal.

It is another object of my invention to provide a construction which is adapted to embodiment in the form of a conversion kit which can be added to existing master cylinders in order to convert them into an improved type of master cylinder according to my invention.

A further object of the present invention is to maintain an initial hydraulic pressure within the system in order to take up the slack on the parts and improve the operation of the brakes, especially when for any reason clearances between the drum and shoes increase or wear takes place in the other parts of the system.

Additional objects of the invention are to provide a master cylinder construction that is simple and easy to build, and also one that is easy to install and to service in order that it may be maintained in effective operation.

These and other objects and advantages of my invention have been attained in a master cylinder construction according to my invention by providing a housing having a bore formed with two adjoining sections of different diameters which are axially aligned with each other, thus forming two hydraulic cylinders of different sizes. The housing also provides a fluid reservoir which is in communication with the larger cylinder through a suitably designed inlet passage way. The smaller cylinder has an outlet to the brake line. In each of these two bores of different diameters are pistons of corresponding diameters, the two pistons being physically separated but the larger piston being engageable with the smaller piston so that both pistons can advance together. Suitable fluid passage means are provided between the larger and smaller cylinder in order for fluid to flow from one cylinder into the other under controlled conditions. An auxiliary chamber of variable volume is provided which is adapted to receive hydraulic fluid through a passage way communicating with the larger cylinder. The auxiliary chamber is preferably provided with some means, such as a spring loaded piston, which tends to contract the volume of the auxiliary cylinder and thus force fluid out of the auxiliary chamber and back into the larger piston when pressure in the system is lowered in order to release the brakes.

How the above objects and advantages of my invention, as well as others not specifically referred to herein, are attained will be more readily understood by reference to the following description and to the annexed drawings, in which:

Fig. 1 is a side elevation of a master cylinder construction according to my invention showing its relationship to the other portions of the hydraulic system, including the operating foot pedal;

Fig. 2 is a vertical median longitudinal section through the master cylinder construction of Fig. 1 showing a conventional master cylinder to which has been added a conversion unit for modifying the conventional cylinder according to my invention, showing the parts in rest position;

Fig. 3 is a vertical section similar to Fig. 2 but showing the parts in positions occupied when the brakes are being applied;

Fig. 4 is an enlarged vertical transverse section on line 4—4 of Fig. 2;

Fig. 5 is a vertical median longitudinal section through a variational embodiment of my invention with the parts in rest positions;

Fig. 6 is a transverse section on line 6—6 of Fig. 5; and

Fig. 7 is a fragmentary section similar to Fig. 5 showing the cylinder sleeve only with the internal parts in positions occupied when the pistons are advanced to apply the brakes.

Referring now more particularly to Fig. 1, there may be seen in side elevation the housing or body of my improved master cylinder. The body is in two parts indicated generally at 10 and 11. In this embodiment of my invention, the larger portion 10 of the housing may be the body of a master cylinder of conventional design which has been modified in accordance with my invention by adding thereto the smaller housing 11 and its allied parts.

Housing 10 is attached to the frame of the automobile in any suitable manner, as for example by means of bolts 12. The master cylinder unit is provided with operating piston rod 14 which engages and moves the piston in the cylinder in a manner to be described. Piston rod 14 is connected by pivot pin 15 to arm 16 of foot pedal 17 by which the master cylinder is operated, in a well known manner. Brake pedal 17 is pivotally mounted by shaft 18 on the frame of an automobile or other supporting structure. The brake pedal is normally held in the released position in which the brakes are off by spring 19 which is connected at one end to a stationary member, such as a portion of the frame (not shown), and at the other end is attached to arm 16 of the brake pedal. The pull of pedal retracting spring 19 normally returns the brake pedal and piston rod 14 to the rest position at the extreme left hand end of its range of movement, as seen in Figs. 1 and 2.

The inner end of piston rod 14 is preferably rounded as shown in Fig. 2 in order to have a ball-and-socket engagement with the piston to permit a slight pivotal movement of the piston rod about its point of engagement with the piston, as is usual in these devices. A flexible cap or hood 20 encloses piston rod 14 at the open rear end of the cylinder to exclude dirt and foreign matter from the cylinder and yet permit the necessary movement of the piston rod. This construction is also conventional in its nature.

At the other end of the assembled master cylinder, there is attached hydraulic line 21 through which fluid under pressure flows from the master cylinder to the hydraulically actuated devices, in this case the individual operating cylinders of the brakes. Hydraulic line 21 has branches 21a and 21b leading to the front and rear wheels respectively; and each of these branches may be further subdivided to provide supply lines to as many individual hydraulically actuated devices as may be necessary.

In the upper portion of housing 10 there is provided a reservoir space 24 which is normally partially filled with a reserve supply of fluid. Access is had to the reservoir through filling plug 25 which may be removed to add fluid to the reservoir. In the lower portion of housing 10 is cylindrical bore 27 which is in communication with the reservoir space above it through main supply port 28 and a relatively smaller bleeder or compensating port 29. Ports 28 and 29 are conventional in design and location and function here in a known manner to insure that the system is filled with fluid and free of air bubbles.

The forward end of cylindrical bore 27 is internally threaded and adapted to receive an externally threaded nipple on one end of housing section 11 in order to connect together the two housing sections 10 and 11. This is typical of the manner in which housing 11 may be added to a conventional cylinder housing 10 in order to effect conversion of the conventional unit to a master cylinder unit of my improved construction. It will be understood that body sections 10 and 11 are not necessarily made separate but may be made as one piece, which is a practical construction when the entire master cylinder unit is initially made to conform to my invention.

Housing 11 is provided with an internal cylindrical bore 31 which opens at its rear end into bore 27. Thus there is formed in effect within the body of the unit a continuous cylindrical bore in two sections of different diameters, the forward section being of smaller diameter than the rearward section and the two sections being concentric or axially aligned.

Within cylinder 27 is a piston indicated generally at 33 which has novel design features and replaces the conventional piston when modifying a conventional master cylinder. At the rear end of piston 33 there is a flange 34 of the full diameter of bore 27 to guide the rear end of the piston and to support packing ring 35 which is designed to prevent operating fluid from leaking out the rear open end of cylinder 27. Housing 10 is provided with washer 36, held in place by split ring 37 or other similar means, that forms an abutment to limit the rearward travel of piston 33. The forward end of piston 33 is externally threaded to receive ring 38 and is internally threaded to receive a threaded extension on piston head 39. Piston head 39 is normally opposite port 29 when the piston is in rest position (Fig. 2); but there is sufficient annular clearance between head 39 and the wall of cylinder bore 27 that port 29 is in communication with the cylinder space and provides fluid passage means for escape of air and any excess fluid from the low pressure cylinder when the piston is retracted to the rest position shown. This construction is resorted to since housing 10 is assumed to be of conventional design with ports 28 and 29 already located and the pistons of novel design are replacing the original piston to obtain my improved structure.

Between ring 38 and head 39 is carried suitable packing 40 which is designed to hold fluid under pressure ahead of the piston from leaking past the packing and into the space to the rear of packing 40. The space 41 in bore 27 and forward of or to the right of piston head 39 when piston 33 is at rest, is a working cylinder adapted to apply pressure to the fluid therein; and is a low pressure cylinder compared with the second or high pressure cylinder, to be described.

In between ring 38 and rear packing 35 the body of piston 33 is materially smaller in diameter than cylinder bore 27. As a result, there is a space within cylinder bore 27 but behind the piston head which is adapted also to hold a supply of fluid. This space is indicated at 42 and is in free communication with reservoir 24 through port 28 since the sizes and relationship of the several parts are such that port 28 is open at all times as it is uncovered with piston 33 is at its fully retracted or rearward position, as shown in Fig. 2. Since the fluid in reservoir 24 is not subjected to any pressure, the fluid in space 42 is likewise not under pressure. Piston head 39 is provided with a longitudinally extending central bore 45 which opens at the front end of the piston and extends rearwardly to communicate with a short axial passage 46 in the main body of the piston. Passage 46 opens into transverse passage 47 which extends from side to side of the body of the piston and is open at both ends to space 42 at the rear of the piston head. The rearward portion of passage 45 within the piston head is enlarged to receive ball 48 which is normally urged rearwardly by compression spring 49 to seat against the forward end of passage 46 and thus prevent fluid movement to the rear through passages 45 and 46. At the same time, when the pressure differential is such that higher fluid pressure is on the back side of ball 48, it is unseated by this pressure and compresses spring 49 slightly to allow fluid from space 42 to flow through passages 47, 46 and 45 in that order into cylinder 41 ahead of piston 33.

The forward piston indicated generally at 50 is mounted to reciprocate within cylinder 31 which is the cylinder of smaller diameter. The piston has a section of a diameter substantially equal to the diameter of cylinder 31 and provided with suitable packing at 51 to prevent fluid from leaking past the piston. Piston 50 is provided with a longitudinally extending fluid passage indicated generally at 52 which opens at its rear end to large cylinder 41 and at its forward end to the space within small cylinder 31. Thus passage 52 constitutes fluid passage means in piston 50 which extends between the larger cylinder and the smaller cylinder.

Passage 52 has a constriction at 53 which forms a seat for ball check 54. Ball 54 is normally urged rearwardly by spring 55 to seat against constriction 53 as in Fig. 3 in order to prevent rearward flow of fluid through passage 52 when the ball check is closed. However, the usual position is the open position of Fig. 2, as explained below. The forward end of spring 55 bears against an apertured plug 56 in an enlarged forward terminal portion of passage 52 which is internally threaded to receive plug 56. In addition to an opening through this plug in order to permit escape of fluid through the plug, the forward end portion of piston 50 is preferably of reduced diameter and provided with one or more side openings 57 to facilitate the movement of fluid from passage 52 through the walls of the piston into the smaller cylinder.

It is desirable to limit the extent of rearward travel of piston 50 and also to open check valve 54 when the piston is in the extreme rearward position. Both of these functions are carried out by elements now to be described, although obviously separate means may be provided for each purpose, if desired. Cross pin 60 is mounted in a fixed position by attaching its ends to the walls of housing 11. It extends transversely across cylindrical bore 31 near its rear end. Piston 50 is provided with transverse slot 62 which extends longitudinally of the piston for a substantial distance in order to receive cross pin 60 and permit movement of the piston with reference to the pin. Located in the forward end of passage 52 ahead of cross pin 60 and rearwardly of constriction 53, is loose pin 63 which slides in passage 52. The main portion of this loose pin preferably has a plurality of radially extending ribs, making for example the cruciform cross-section seen in Fig. 4, in order that it does not completely block passage 52 and yet has bearing against the walls of the passage. It will be understood that any other shape may be used for the pin that accomplishes these same objectives. At its forward end, pin 63 has a central projection of small diameter which is long enough to extend through constriction 53 to engage ball check 54 and lift it from the seat, as described below.

As piston 50 moves fully to the rear, the rear end of loose pin 63 engages fixed cross pin 60 and the forward ends of the ribs on the loose pin engage the rear side of the shoulder in passage 52 forming constriction 53, thus limiting the rearward travel of the piston. As will be noted from Fig. 2, smaller piston 50 stops its rearward travel short of the position occupied by larger piston 33 when the latter is also in its most rearward position. Thus there is left a gap at 65 between the two pistons when they are both at rest in their normal fully retracted positions. It will also be noted from Fig. 2 that in this position ball check 54 is held open. The reduced diameter section of pin 63 projects completely through constriction 53 and engages the rear side of ball 54 to lift it off the seat at constriction 53. With check valve 54 held open, fluid may pass freely in either direction through passage 52 between the larger cylinder 41 and smaller cylinder 31 when the parts are in the rest position.

Compression spring 66 bears against head 39 and against a rearwardly facing shoulder on piston 50 to keep the pistons separated when at rest and insure that rear piston 33 is fully retracted to uncover compensating part 29. Piston 50 is normally urged toward the left to the retracted or rest position by compression spring 67 which at one end bears against a forwardly facing shoulder on the piston.

Annular plug 68 is screwed into the forward end of cylinder 31 to hold spring 67 in place. The plug has an opening that provides an outlet opening for the high pressure cylinder and to which brake line 21 is connected to receive fluid under pressure to actuate the brakes. This outlet is closed by check valve 69 which may be of any suitable design, the one here shown being of conventional design. The valve comprises a domed metal disc 69a having at its base a flat rim of an overall diameter that is somewhat less than the diameter of cylinder 31. The rim of the disc rests against plug 68 in sealing relation while the domed part of disc has a plurality of holes or fluid passages through it. Attached to the metal disc on the outlet side is a flexible disc or flapper 69b which yields to outward flow to allow flow through the valve only toward the right in Figs. 2 and 3. The flexible member is moved to and held in a closed position by fluid pressure against it when fluid flow is in the reverse direction.

Spring 67 bears against the rim of valve 69 to hold it against plug 68; but the spring yields to pressure of fluid flowing into the cylinder through line 21 and plug 68 when this reverse flow pressure is in excess of some low value, usually about 5–15 p. s. i. Above this pressure valve 69 is displaced bodily or lifted at one side to allow returning fluid to enter cylinder 31, and then it closes to maintain a small residual pressure in the brake line, as is usual practice.

The bore of cylinder 31 may be of uniform diameter for its full length if desired; but it is preferred that the bore be of a larger diameter at a point ahead of the forward travel of piston 50, as shown in Fig. 2. At the junction of the different diameters of bore 31 is placed port 70 which is normally closed at its outer end by plug 70a threaded into body section 11. Port 70 may be opened to bleed off any air collected in the smaller cylinder and is then closed after the brakes are adjusted by seating plug 70a firmly as shown to close the port and hold in fluid pressure.

According to my invention I provide an auxiliary chamber of variable volume which is adapted to receive working fluid from the larger or low pressure cylinder during application of the brakes. In the embodiment of Fig. 2, this chamber is space 71 within auxiliary housing 72 which is suitably connected to housing section 11, as by a threaded stem on housing 72 screwed into an opening in the bottom side of housing 11. This construction is utilized here because of the fact that the overall design is intended to utilize as fully as possible existing equipment on a vehicle and to change over or modify that equipment to obtain the advantages of my invention with parts which may be added quickly and easily. When the entire unit is designed and manufactured new, the location of the auxiliary chamber may be altered if desired. Housing 72 is preferably beneath housing 11 in order that air may escape upwardly from housing 72 and not be trapped therein. Such air can then escape from the system through cylinder 31 or 41. Inside auxiliary housing 72 is plunger 73 which is normally urged to the raised position shown in Fig. 2 by compression spring 74 which bears against the under side of the plunger and also against cap 75 threaded into the lower end of the auxiliary housing to close the internal bore. Spring 74 pushes at all times on the plunger upwardly to contract or reduce the volume of chamber 71 to a minimum and, when the fluid pressure is low enough, fluid is discharged from the chamber 71 by the force of spring 74 moving the plunger.

The travel of plunger 73 in a direction to enlarge auxiliary chamber 71 is adjustably limited by stop screw 77 threaded into cap 75. Lock nut 78 holds the stop screw in adjusted position. Plunger 73 has suitable packing at 79 to prevent fluid from leaking past the plunger.

Fluid from cylinder 41 reaches auxiliary chamber 71 by way of by-pass 80 in housing 11, extending parallel to the axis of high pressure cylinder 31. Passage 80 intersects at its forward end the hole in housing 11 into which the hollow threaded stem on auxiliary housing 72 is screwed. In this stem is passage 81 through which fluid flows from passage 80 into auxiliary chamber 71. When the brakes are released, the lower end of passage 81 is normally closed by ball check 83 which seats against the open end of passage 81 and is held in seated position by compression spring 84. At the other end, spring 84 bears against a plug threaded into an internal cavity 82 in plunger 73. At its upper end cavity 82 is contracted to a diameter less than the diameter of ball 83 in order to hold the ball 83 against leaving cavity 82 (see Fig. 3) and move it downward with the plunger as the latter moves downward. This downward movement of the plunger removes ball 83 from its seat at the end of passage 81. Plug 85 forms an abutment on plunger 73 which engages the end of limit screw 77.

In order to permit expansion chamber 71 to be fully exhausted of fluid, it is preferable to provide one or more by-pass passages 86 around check valve 83. These passages are in the stem portion of housing 72 and extend from the upper end of chamber 71 to the enlarged cavity within the stem where they communicate with by-pass 84. Passages 86 are closed at their upper ends by check valve 87. Valve 87 is an annular member with a central opening which forms a part of passage 81. By virtue of its own weight valve 87 rests upon and closes the upper end of by-pass 86 and is held in this position by fluid pressure developed within the cylinder 41. When the pressure within chamber 71 exceeds that within the low pressure cylinder, fluid passes upwardly through passages 86 to return to cylinder 41, the fluid pressure being sufficient to lift annular valve 87 and allow the fluid to reach passage 81.

Having described the construction of a preferred typical embodiment of my invention, I shall now discuss its operation. The operation of the unit may be considered to take place in two stages as the brakes are applied. The first stage is a low pressure stage in which pressure is applied to the hydraulic fluid only by the larger piston while in the second stage relatively high pressure is applied to the fluid in the brake lines by the smaller piston.

Referring now to Fig. 2, it will be seen that within a small fraction of an inch after piston 33 starts to advance, it covers and seals compensating port 29 and begins to build up pressure on the fluid in cylinder 41 which is always filled completely with fluid at the beginning of a stroke. As piston 33 advances, hydraulic fluid is displaced from cylinder 41 in front of the piston and is forced at low pressure through passageway 52, past open check valve 54, into cylinder 31 ahead of piston 50. The fluid then leaves through brake line 21. At first, the larger piston moves independently of the smaller piston and relative thereto until the gap at 65 is closed and head 39 of the rear piston engages the rear end of the smaller piston. Spring 66 is now slightly compressed. After the two pistons come into engagement as in Fig. 3, they move forward together as a unit for an additional short distance sufficient to allow valve 54 to seat. This check valve closes as piston 50 moves forwardly because loose pin 63 and ball 54 can now move to the rear relative to piston 50 under the force applied by spring 55 until the ball check seats at 53. Fluid is discharged at low pressure from the master cylinder unit until valve 54 seats. This pressure may be of any predetermined value; and in present day systems is typically about 160-200 p. s. i. This is adequate to expand the brake shoes into contact with the brake drums, ready for braking action.

During this low pressure period valve 83 remains closed so that no fluid escapes from cylinder 41 through by-pass 80. The area of the valve seat at the end of passage 81 is relatively small so that the net force on ball 83 is small. This force is resisted by spring 84 which is a light spring, typically about a 10 pound spring, and holds the ball valve closed against such pressures as develop in the low pressure stage.

After valve 54 closes, the second or high pressure stage of the hydraulic action commences. Up to this time hydraulic pressures within both cylinders 41 and 31 have been the same because there was free intercommunication through passage 52; but when check valve 54 closes hydraulic fluid is trapped ahead of the smaller piston and it cannot flow to the rear into cylinder 41 even though the pressure in the small cylinder is higher. However, in order to permit further advance of the large piston suitable added provision must be made to allow fluid to be displaced from the low pressure cylinder as piston 33 continues to advance. It is for this purpose that by-pass 80 and auxiliary chamber 71 are provided.

As the two pistons continue to advance fluid displaced from the low pressure cylinder ahead of piston head 39 passes through passages 80 and 81 into auxiliary chamber 71, driving plunger 73 downwardly and compressing spring 74. This position of the parts is shown in Fig. 3. As a result, fluid displaced from the low pressure cylinder is accommodated by an expansion in the volume of chamber 71. After valve 83 opens, the pressure on the fluid in cylinder 41 suddenly drops since the pressure imposed by spring 74 becomes the limiting factor determining fluid pressure in this part of the master cylinder unit. For example the fluid pressure here may now drop to around 20 p. s. i., or whatever is found adequate to insure sufficiently fast return of fluid through by-pass 80—81, as will be mentioned again.

Continued advance of the smaller piston 50 displaces fluid from the high pressure cylinder ahead of this piston and drives that fluid out of the cylinder at a relatively high pressure through lines 21 to actuate the brake cylinders, or other operating units. Since the net effective area of the forward face of piston 50 is less than the net effective area at the forward end of piston 33, a higher hydraulic pressure at the brake cylinders can now be obtained with the same force applied to the pistons through piston rod 14. Assuming for purposes of illustration that the ratio between the net effective areas of the larger piston and the smaller piston is 2:1, then a given force applied to smaller piston 50 produces twice the unit hydraulic pressure in brake line 21 that would be obtained with an equal force if applied only by larger piston 33.

During all of this forward movement of the pistons, it will be appreciated that check valve 48 remains closed. It is normally closed by the force applied to it by spring 49 which is reinforced by the hydraulic pressure built up in cylinder 41 ahead of the ball check.

The length of travel of plunger 73, i. e. the maximum volume of chamber 71, is regulated by the position of limit screw 77. As the screw is lowered, the increased downward travel of plunger 73 correspondingly increases the maximum volume of chamber 71. When plunger 73 engages limit screw 77, the expansion of chamber 71 is stopped and no further fluid can leave the low pressure cylinder through by-pass 80 and 81. As a result, the movement of both pistons ceases until enough force is applied to the larger piston to raise the unit fluid pressure in the low pressure cylinder to equal the unit fluid pressure in the high pressure cylinder. After these pressures become equalized, an increase in fluid pressure in cylinder 41 opens check valve 54 and fluid can again flow through passage 52 into the smaller cylinder and then outwardly into brake line 21. When the valve 54 is open further movement of both pistons as a unit is possible; but they act in the same way as if only piston 33 were present or effective to determine the fluid pressure. Pressures equalize when piston advance ceases, thus allowing ball 54 to seat under the force of spring 55 when the pistons come to rest at any time during application of the brakes.

This safety feature is of value under any condition that causes the brake pedal to be depressed excessively before the brakes are applied, as when there is extreme wear of the parts, especially brake shoes, or brake fluid has leaked out of the system. Under these circumstances, the two pistons can move together and act essentially as if there were no compounding of the pistons but only the low pressure piston were employed. The advantage of this arrangement is the fact that a given axial movement of the larger piston displaces a greater volume of hydraulic fluid into brake line 21 than does an equal movement of smaller piston 50. Hence, this device automatically adjusts itself to provide a large volume of fluid at a lower pressure when necessary in order to apply the brakes and conditions are such that the forward piston of smaller diameter cannot displace enough fluid to develop the high pressure normally obtained when the brake system is functioning properly. It is obvious that the point in the travel of the pistons at which chamber 71 ceases to expand and consequently valve 54 opens can be controlled by movement of screw 77 toward and away from plunger 73.

The return stroke of pistons 33 and 50 takes place when brake pedal 17 is released for the purpose of releasing the brakes. Piston return spring 67 presses on piston 50 to move it back to the rest position of Fig. 2; and this return movement of the pistons is aided by retraction spring 19 which restores the brake pedal and piston rod 14 to their original rest positions. Movement of the piston rod and expansion of spring 66 return piston 33 to its rest position. Reverse movement of the pistons is accompanied by reverse flow of fluid within the system, the force for this purpose coming from separate sources. The individual brake cylinders ordinarily have within them means for exhausting operating fluid which then flows in reverse direction to branches 21a and 21b and main line 21 into cylinder 31. At the same time spring 74 moves plunger 73 upwardly causing a return flow of fluid out of chamber 71 through passages 81 and 80 back into cylinder 41. Since ball 83 seats to close passage 81 before plunger 73 reaches the end of its upward stroke, the last portion of hydraulic fluid is exhausted through by-passes 86, the pressure of the fluid being sufficient to lift check valve 87 and allow the fluid to flow around the check valve and into passage 81 and then return through by-pass 80. Since the pressure in cylinder 41 is normally lower than that in cylinder 31, check valve 54 remains closed during the initial portion of the return stroke and until loose pin 63 engages fixed cross pin 60 at one end and ball check 54 at the other end to unseat the ball from the seat at constriction 53, thus restoring free fluid communication between the two cylinders through passage 52.

As long as the two pistons are returned at what may be termed a low or moderate speed, only the conditions just described prevail. Return flow of fluid to the master cylinder from both line 21 and the auxiliary chamber is fast enough to keep the working cylinders filled with fluid and maintain substantial pressures within them. But if the pistons are returned at a higher speed, an additional fluid flow takes place. When piston 33 moves to the left at a sufficiently high rate it expands the volume of cylinder 41 faster than hydraulic fluid can be returned to it from expansion chamber 71, with the result that a sub-atmospheric pressure is created in the cylinder. As a consequence, the fluid pressure on the forward side of check valve 46 drops sufficiently that fluid in space 42 is able to open the valve and flow forwardly through the piston passages 47, 46 and 45 into cylinder 41, adding to the total volume of fluid within the hydraulic system ahead of piston 33. If piston 33 is returned to the rest position and allowed to remain there, this excess fluid is then forced out of the chamber through port 29 into reservoir 24 by fluid returning to the master cylinder from other parts of the system, as just described.

On the other hand, advantage may be taken of this flow to increase the volume of operating fluid ahead of the pistons by quickly advancing piston 33 past port 29 and trapping the excess fluid ahead of the piston. This is accomplished by the familiar practice of quickly pumping the foot pedal once or twice. Under various conditions, such as excessive wear of the brake shoes or loss of fluid from the system, there is insufficient fluid in the system upon the initial advance movement of the pistons to operate the brakes properly. By pumping the foot pedal, the action just described takes place and additional fluid can be introduced into the operative portion of the system to obtain better control and operation of the brakes or other actuated units. This is an advantage over some types of brake master cylinders in which actual loss of pressure results from "pumping."

There is shown in Figs. 5, 6 and 7 a variational embodiment of my invention which is essentially the same as the form described above except for a change in the construction and location of the auxiliary chamber. This embodiment is also designed to use the reservoir of a conventional master cylinder but to which there has been added a cylindrical sleeve containing the operating pistons. This sleeve is a replacement for the cylinder and piston assembly of conventional design originally used with the reservoir housing. Again, the complete housing consists of two parts, outer housing portion 90 which provides the oil reservoir space 94 and sleeve 91 which extends through and beyond the lower portion of housing portion 90 and is held in place by nut 92 threaded onto the sleeve and bearing against the reservoir portion of the housing. An integral flange 91a bears against the other side of housing portion 90. Access is obtained to the reservoir through filler plug 93.

Inside sleeve 91 there is formed a cylindrical bore 95 in two adjoining sections of different diameters, the two sections of the bore being concentric or axially aligned in the same manner as described above. The forward section of this bore is of smaller diameter than the rearward section. In the larger diameter portion of bore 95 there is provided piston 96 which is mounted for reciprocating movement within the bore. Piston 96 is a low pressure piston and consists of an axially extending stem on the forward end of which is mounted piston head 96a. The piston head is provided with suitable packing which engages the walls of bore 95 in order to prevent leakage of fluid rearwardly past the piston. Piston head 96a is provided with one or more fluid passages 97 extending axially through the piston head to permit fluid to pass through the piston under certain circumstances, as will be later mentioned.

The space within the larger diameter section of bore 95 forwardly of piston 96 is the low pressure cylinder 98; and piston 96 is adapted to apply pressure to fluid within that cylinder when fluid passages 97 are closed. To close these passages, there is provided at the rear end of them valve member 100 which is slidably mounted upon the stem of piston 96. Valve 100 is normally urged to the forwardly position (Fig. 5) in which it closes and seals fluid passages 97, by spring 101 which bears at one end against the rear side of valve 100 and at the other end against a flange on the stem of piston 96. Valve 100 is slidably mounted upon a reduced diameter portion of the piston stem and can move rearwardly as far as shoulder 96b. The valve is annular in shape and is provided with packing on its inner and outer peripheries to engage respectively the piston stem and the walls of bore 95 to prevent leakage of fluid rearwardly of the valve member. Member 100 also acts as a plunger, as will be pointed out.

Mounted for longitudinal reciprocation within the smaller diameter section of bore 95, is high pressure piston 104 which is provided near its forward end with suitable packing in order that forward movement of the piston may apply pressure to fluid within space 105 forwardly of the piston. Rearward movement of piston 104 is limited by stop pin 103 mounted on the wall of sleeve 91 to engage a shoulder on the piston, as shown in Fig. 5. Compression spring 102 bears against piston 104 and piston 96 to insure full return of the latter to its rest position (Fig. 5) when the brakes are released.

The forward portion of the small diameter bore is the high pressure operating cylinder. High pressure piston 104 is provided with a longitudinally extending bore 106 which communicates at its rear and through transverse passage 107 with low pressure cylinder 98. The forward end of passage 106 is of enlarged diameter to provide a valve chamber within which ball check 108 is located. Ball 108 is normally urged to the rear to seat against the smaller diameter portion of passage 106 by spring 109. The forward end of passage 106 is internally threaded to receive plug 110 which forms an abutment against which the forward end of spring 109 bears. Plug 110 has a central passage way which forms in effect a continuation of passage 106 in order to permit fluid communication with high pressure cylinder 105. Passages 106 and 107 and the opening in plug 110 form a continuous passage way permitting fluid flow between the low and high pressure cylinders; and valve 108 when closed prevents flow from the high pressure cylinder into the low pressure cylinder.

Fluid is admitted into low pressure cylinder from reservoir 94 through fluid passage means extending between the reservoir and cylinder, comprising passages 111 and 112. Between these two passages is chamber 114 in which check valve 115 is located. Ball 115 is normally seated by spring 116 against one end of passage 111 to prevent flow of fluid out of the low pressure cylinder when pressure is applied to the fluid therein. However, spring 116 is a relatively light spring and allows ball valve 115 to be displaced inwardly so that fluid can flow from the reservoir via passage 111 to passage 112 and then into cylinder 98 when the proper relative pressures exist.

Communication also exists between high pressure cylinder 105 and reservoir 94 by means of passage 118, which functions like compensating port 29 and is shown more clearly in Fig. 6. Passage 118 opens to the high pressure cylinder 105 as close as possible to the highest point of the cylinder in order that any air trapped within the cylinder may escape through the passage. Air or excess fluid can pass from the high pressure cylinder through the passage into reservoir 94. The opening of this passage into the high pressure cylinder is located immediately ahead of the position occupied by piston 104 when at rest, as shown in Fig. 5, so that the port is sealed by the piston very shortly after the piston starts its advance.

The forward or outlet end of high pressure cylinder 105 is closed by check valve 120 which may be of any suitable design, the one illustrated being of conventional design similar to valve 69. It consists of a domed metal disk 121 with a plurality of holes or fluid passages through the domed part of disk. Attached to the metal disk on the outlet side is flapper 122 which yields to allow fluid flow out of the cylinder only, that is toward the right of Fig. 5. The flexible member is moved to a position to close the openings in metal disk 121 by return flow into the cylinder.

Compression spring 125 is placed in high pressure cylinder and bears at one end against the forward face of piston 104 and at the other end against the rim of check valve 120 to seat the rim of the valve against washer 126. The pressure of the spring not only returns the high pressure piston to the left end of the cylinder when the brakes are released, but also yieldingly secures valves 120 in position at the outlet end of the cylinder. Spring 125 allows the check valve 120 to be displaced bodily or tilted away from washer 126 in order to permit fluid to flow into the high pressure cylinder around check valve 120.

From the previous description of the operation of the preferred embodiment of my invention, it is believed that the operation of the present form will be understood without detailed discussion. As low pressure piston 96 commences to advance in response to thrust applied by piston rod 14, pressure is built up upon fluid in low pressure cylinder 98. This pressure closes check valve 115 sealing off flow into reservoir 94. The pressure on the fluid is sufficient to unseat valve 108 allowing fluid at low pressure to flow through passages 106 and 107 past the check valve into the high pressure cylinder 105 from which the low pressure fluid leaves the master cylinder unit through the usual brake line 21. During this initial period of movement the larger piston moves independently of the smaller piston and relative thereto until gap 123 between pistons 96 and 104 is closed and the head of the rear piston engages the rear end of the smaller piston.

During the advance of piston 96 into engagement with piston 104, valve 109 seals fluid passages 97 in the piston head 96a and the low pressure piston is for all practical purposes impervious to fluid. However, after the pressure within cylinder 98 reaches and passes a certain predetermined critical value the fluid pressure applied to valve 100 through passages 97 is sufficient to compress spring 101 and allow the valve to be separated from the rear face of piston head 96a. In line with the typical figures given before, assume that this critical value is 200 p. s. i. in the low pressure cylinder. Assume also that the total cross sectional area of all passages 97 is .25 square inch. The force applied to valve 100 by fluid at passages 97 then builds up until the rearward force on it reaches the value of 50 pounds at the critical fluid pressure. Spring 101 is so designed that when a pressure of 50 pounds is applied to it, it yields; and as soon as the valve is separated from the piston head the fluid pressure is applied over the entire face of valve 100, moving the valve member to the rear relative to the piston head as shown in Fig. 7 creating an expansible auxiliary chamber 130 between these two elements. The fluid pressure in chamber 130 and cylinder 98 immediately drops to a low value determined by the strength of spring 101.

Fluid can flow from the low pressure cylinder through passages 97 into variable volume chamber 130 in the same way as it flows into chamber 71 in the form illustrated in Fig. 3. Likewise reverse flow of fluid through passages 97 occurs under the proper fluid pressures when the force of spring 101 is able to overcome the opposing fluid force and moves valve 100 to the right. When so moved, the annular member 100 acts as a plunger that contracts auxiliary chamber 130 to its minimum volume, assumed to be zero, and completely exhausts auxiliary chamber to the low pressure cylinder 98.

During the low pressure stage and while piston 96 is moving into engagement with piston 104, valve 108 is open allowing a flow of fluid from the low pressure into the high pressure cylinder. After the two pistons come into engagement (shown in Fig. 7), they move forward together as a unit. After engagement of the two pistons, the critical fluid pressure is reached at which valve 100 opens. The consequent reduction in fluid pressure in the low pressure cylinder is not communicated to the high pressure cylinder because the pressure differential closes valve 108. With the closure of valve 108, the second or high pressure stage commences and further advance of the two pistons as a unit is made possible by the partial evacuation of fluid in the low pressure cylinder to the expansible auxiliary chamber in the manner just described. With the closure of valve 108 fluid can no longer flow between the two cylinders and operating pressure is applied by the forward piston of smaller diameter to the fluid in cylinder 105. Assuming the same force to be applied to small diameter piston 104 as was formerly applied to large diameter piston 96, the fluid will now be delivered from the master cylinder unit at a proportionately higher pressure, for the reasons previously described.

In both forms of the invention the low pressure stage displaces a comparatively large volume of fluid to take up the slack in the system and bring the brake shoes into contact with the drums, and also to afford light braking. The main braking effort is produced during the high pressure stage when a small volume of fluid is displaced and so high pressures can be developed, making less effort by the operator necessary.

Shortly after the initial movement of piston 104, port 118 is closed, after which time fluid is retained within the high pressure cylinder. During both the high and low pressure stages, the flexible valve member of check valve 120 yields and allows fluid to pass outwardly past the valve to brake line 21.

The return stroke of the two pistons takes place when brake pedal 17 is released in order to release the brake. At this time the thrust delivered by piston rod 14 ceases. Several forces are then exerted to restore parts to their position of rest, including spring 19 which acts directly on piston rod 14 and piston 96 to move these parts to the left to the rest position of Fig. 5. Spring 125 expands and drives piston 104 to the left. The brake cylinders or other hydraulically actuated units tend to return operating fluid to the master cylinder; and this return pressure of the fluid is sufficient to unseat check valve 120 against the pressure of spring 125 and allow the fluid to flow around the check valve into high pressure cylinder 105 as long as the back pressure of the fluid exceeds a fixed relatively low value. When this back pressure drops below some preset figure, usually in the neighborhood of 10 to 15 p. s. i., spring 125 seats check valve disk 121 against washer 126 to stop flow of fluid around the valve. Thus a small residual pressure is left in the brake lines at all times. The return of fluid to cylinder 105 assists in driving piston 104 to the left until bleeder port 118 is uncovered when the fluid in excess of that required to fill the cylinder is exhausted into reservoir 94. Air in the system also bleeds off at port 118.

Movement to the left of piston 96 causes a marked reduction in the fluid pressure in low pressure cylinder 98 and spring 101 advances the combined plunger and valve 100 into contact with the piston head, completely exhausting the auxiliary chamber at 130 and again adapting the piston to deliver pressure to fluid in the low pressure cylinder. If piston 96 retracts with sufficient rapidity to cause a partial vacuum to form within the low pressure cylinder, the fluid pressure in the reservoir applied through passage 111 is sufficient to unseat ball check 115 and fluid flows past the check valve into passage 112 and thence into cylinder 98. Since this action occurs normally each time the piston is rapidly returned to the rest position, the action not only insures that the low pressure cylinder is continually filled with fluid but advantage may be taken of this action by pumping the brake pedal rapidly one or two times to obtain extra fluid which can be forced into the system if needed, for reasons previously mentioned.

In general, except for the differences noted, the construction and operation of the device illustrated in Figs. 5, 6 and 7 is the same as that of the form of the invention first described. Structurally it will be appreciated that the chief difference between these two designs is in the location and construction of the expansible auxiliary chamber. In the first instance the chamber is mounted on the wall of the high pressure cylinder and communicates with the low pressure cylinder through fluid passages which are provided with check valves to control the flow of fluid therethrough. In the second form the expansible auxiliary chamber is located behind the low pressure piston and within an extension of the bore within which the low pressure piston moves. Communication between the auxiliary chamber and the low pressure cylinder is through the piston head itself while the movable wall or plunger of the auxiliary chamber acts also as a valve to control fluid flow through the piston.

As a further modification, which is self-evident from Figs. 5 and 7 without specific illustration, piston 104 may be extended rearwardly to close gap 128. The two pistons are then in contact at all times during the forward stroke and the operation is essentially as just described after the two pistons engage. The low pressure stage ends and the high pressure stage begins when valve 100 uncovers ports 97. Stop pin 103 may also be omitted as the smaller piston is limited in its rearward travel by the larger piston. The initial work required to advance the pistons with this modification is relatively higher so that a greater force must be applied to the brake pedal by the operator. Two separate pistons offer advantages of economy in manufacture and assembly.

Having described a preferred embodiment of my invention and certain modifications therein, it will be appreciated that various other changes in the design, construction, and the relative location of the various parts may be made without departing from the spirit and scope of my invention. Consequently, it is to be understood that the foregoing description is considered as being illustrative of, rather than limitative upon, the scope of the appended claims.

I claim:

1. In a master cylinder construction for a hydraulic control system, the combination comprising: a housing providing a fluid reservoir and two adjoining cylinders of different diameters; a first piston reciprocable in the cylinder of larger diameter; a second piston reciprocable in the cylinder of smaller diameter; fluid passage means extending between the reservoir and the larger cylinder; separate fluid passage means extending between the larger cylinder and the smaller cylinder; a fluid outlet from the smaller cylinder; an auxiliary chamber of variable volume adapted to receive fluid; fluid passage means connecting the larger cylinder to the auxiliary chamber; and means tending to contract the volume of the auxiliary chamber to force fluid through said last mentioned passage means back into the larger cylinder.

2. A master cylinder construction as in claim 1 that also includes a check valve in the fluid passage means extending between the two cylinders for preventing fluid flow from the smaller diameter cylinder into the larger diameter cylinder when the valve is closed.

3. A master cylinder construction as in claim 2 that also includes valve operating means for holding open the check valve when the second piston is in fully retracted position.

4. A master cylinder construction as in claim 1 which includes a spring loaded valve in the last mentioned fluid passage for closing the passage means to fluid flow into the auxiliary chamber at fluid pressures below a predetermined minimum.

5. A master cylinder construction for a hydraulic control system, a combination comprising: a housing providing a fluid reservoir and two adjoining cylinders of different diameters, said cylinders being concentric and axially aligned with each other; a first piston reciprocable in the cylinder of larger diameter; a second piston reciprocable in the cylinder of smaller diameter, said second piston being separate from the first piston and engageable by the first piston upon forward movement of the first piston to advance both pistons together; fluid passage means extending between the reservoir and the larger cylinder; separate fluid passage means extending between the larger and the smaller cylinder; a fluid outlet from the smaller cylinder to the control system; an auxiliary chamber of variable volume adapted to receive fluid; fluid passage means connecting the larger cylinder to the auxiliary chamber; and means tending to contract the volume of the auxiliary chamber to force fluid through said last mentioned fluid passage means into the larger cylinder from the auxiliary chamber.

6. In a master cylinder construction for a hydraulic control system, the combination comprising: a housing providing a fluid reservoir and two adjoining cylinders of different diameters aligned with each other; a first piston reciprocable in the cylinder of larger diameter; a separate second piston reciprocable in the cylinder of smaller diameter engageable by the first piston upon forward movement of the first piston to advance both pistons together; fluid passage means extending between the reservoir and the larger cylinder; separate fluid passage means extending between the larger cylinder and the smaller cylinder; a fluid outlet from the smaller cylinder; an auxiliary chamber provided within an extension of the larger diameter cylinder and separated therefrom by the first piston; a fluid passage in the first piston extending between the auxiliary chamber and the larger cylinder; a plunger forming one wall of the chamber and movable toward and away from the first piston to vary the size of the chamber; and spring means normally urging the plunger toward the first piston to a position in contact with the first piston and closing fluid passages in the first piston.

7. In a master cylinder construction for a hydraulic control system, the combination comprising: a housing providing a fluid reservoir and two adjoining cylinders of different diameters aligned with each other; a first piston in the cylinder of larger diameter; a separate second piston in the cylinder of smaller diameter engageable by the first piston upon forward movement of the first piston to advance both pistons together; fluid passage means extending between the reservoir and the larger cylinder; separate fluid passage means extending between the larger cylinder and the smaller cylinder; a fluid outlet from the smaller cylinder; a separate auxiliary chamber of variable volume adapted to receive fluid; fluid passage means connecting the larger cylinder to the auxiliary chamber; and a spring-biased plunger in the auxiliary chamber normally tending to exhaust the chamber.

8. A master cylinder construction as in claim 7 that also includes adjustable stop means for varying the range of travel of the plunger.

9. In a master cylinder construction for a hydraulic control system, the combination comprising: a housing providing a fluid reservoir and having two adjoining cylinders of different diameters aligned with each other; a first piston in the cylinder of larger diameter; a separate second piston in the cylinder of smaller diameter engageable by the first piston upon forward movement of the first piston to advance both pistons together; fluid passage means extending between the reservoir and the larger cylinder; separate fluid passage means extending between the larger cylinder and the smaller cylinder; an auxiliary chamber of variable volume adapted to receive fluid; fluid passage means extending between the larger diameter cylinder and the auxiliary chamber; a movable member in the auxiliary chamber movable in response to fluid pressure in a direction to increase the volume of the chamber; yielding means urging the movable member in a direction to reduce the volume of the chamber and exhaust fluid through the last mentioned fluid passage means; and valve means carried by the movable member closing the last mentioned fluid passage means to fluid flow when fluid pressure in the larger cylinder is below a predetermined value.

10. A modification unit for converting a master cylinder for a hydraulic control system to a compound master cylinder, said master cylinder having a body providing a fluid reservoir and a cylinder interconnected by a fluid passage, and a piston reciprocable in the cylinder, comprising: a housing attachable to the master cylinder body at one end of said cylinder and providing a second cylinder in prolongation of but smaller in diameter than the first mentioned cylinder; a second piston reciprocable in the cylinder of smaller diameter and engageable with the first mentioned piston; a second fluid passage means extending between said two cylinders; a fluid outlet from the second cylinder to the hydraulic control system; an auxiliary chamber of variable volume adapted to receive fluid; fluid passage means connecting the auxiliary chamber to the first mentioned cylinder; and means tending to contract the volume of the auxiliary chamber, to force fluid through the last mentioned fluid passage means back into the larger cylinder.

11. A modification unit as in claim 10 in which the auxiliary chamber is mounted on the attachable housing outside the master cylinder body, and the last mentioned fluid passage extends through a portion of the attachable housing to reach the first mentioned cylinder.

12. A modification unit as in claim 10 which also includes a spring loaded valve in the last mentioned fluid passage closing the passage means to fluid flow into the auxiliary chamber at fluid pressure below a predetermined minimum pressure.

13. A modification unit for converting a master cylinder for a hydraulic control system to a compound master cylinder, said master cylinder having a body providing a fluid reservoir, comprising: a removable sleeve extending through said body to receive at one end an operating piston rod and having two internal axially aligned cylinders of different diameters; a first piston in the cylinder of larger diameter reciprocated by said piston rod; a separate second piston in the cylinder of smaller diameter engageable by the first piston upon forward movement of the first piston to advance both pistons together; fluid passage means extending between the reservoir and the larger cylinder; separate fluid passage means extending between the larger cylinder and the smaller cylinder; a fluid outlet from the smaller cylinder; an auxiliary chamber provided within the sleeve and separated from the cylinder of larger diameter by the first piston; a fluid passage in the first piston extending between the auxiliary chamber and the larger cylinder; a plunger forming one wall of the chamber and movable toward and away from the first piston to vary the size of the chamber; and spring means normally urging the plunger toward the first piston to a position in contact with the first piston and closing fluid passages in the first piston.

14. In a master cylinder construction for a hydraulic control system, the combination comprising: a housing providing a fluid reservoir and a first cylinder; a second housing detachably secured to the first housing and providing a second cylinder of smaller diameter opening at one end into the first cylinder; a first piston reciprocable in the first cylinder; a second piston in the second cylinder and at rest position spaced from the first piston but engageable by the first piston to advance both pistons together;

fluid passage means in the first mentioned housing extending between the reservoir and the first cylinder; separate fluid passage means in the second piston extending between the first and the second cylinders; a fluid outlet from the second cylinder to the hydraulic control system; an auxiliary chamber mounted on the second housing to receive fluid; fluid passage means in the second housing connecting the first cylinder to the auxiliary chamber; means for contracting the volume of the auxiliary chamber to force fluid through the last mentioned passage back into the first cylinder; and valve means in the last mentioned fluid passage preventing flow into the auxiliary chamber at fluid pressures less than a predetermined minimum pressure.

GILBERT E. PORTER.

References Cited in the file of this patent

UNITED STATES PATENTS

| Number | Name | Date |
|---|---|---|
| 1,958,722 | Sinclair et al. | May 15, 1934 |
| 2,031,360 | Boughton | Feb. 18, 1936 |
| 2,057,707 | Carroll | Oct. 20, 1936 |
| 2,298,314 | Sauzedde | Oct. 13, 1942 |
| 2,508,403 | Knauss | May 23, 1950 |
| 2,518,821 | Roy | Aug. 15, 1950 |